United States Patent
Nakahira

(10) Patent No.: US 7,388,607 B2
(45) Date of Patent: Jun. 17, 2008

(54) DIGITAL STILL CAMERA

(75) Inventor: Toshiaki Nakahira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 718 days.

(21) Appl. No.: 10/802,801

(22) Filed: Mar. 18, 2004

(65) Prior Publication Data

US 2004/0239780 A1     Dec. 2, 2004

(30) Foreign Application Priority Data

Mar. 18, 2003   (JP) ............................. 2003-074533

(51) Int. Cl.
*H04N 5/262*   (2006.01)
(52) U.S. Cl. .................................... 348/240.2
(58) Field of Classification Search ............... 348/240.2
See application file for complete search history.

(56) References Cited

U.S. PATENT DOCUMENTS

| | | | | |
|---|---|---|---|---|
| 5,428,390 | A * | 6/1995 | Cooper et al. ............ | 348/240.2 |
| 5,631,458 | A * | 5/1997 | Nakahira et al. ......... | 250/214 P |
| 5,854,949 | A | 12/1998 | Furukawa et al. | |
| 5,858,949 | A * | 1/1999 | Moschner .................... | 510/314 |
| 5,966,171 | A * | 10/1999 | Hieda ........................ | 348/240.2 |
| 6,509,927 | B1 * | 1/2003 | Prater et al. .............. | 348/222.1 |
| 6,765,616 | B1 | 7/2004 | Nakano et al. | |
| 6,801,250 | B1 * | 10/2004 | Miyashita ................ | 348/220.1 |
| 7,164,442 | B2 * | 1/2007 | Takane ..................... | 348/240.2 |
| 2002/0122121 | A1 | 9/2002 | Fujii et al. | |
| 2005/0012826 | A1 | 1/2005 | Hattori et al. | |

FOREIGN PATENT DOCUMENTS

| | | |
|---|---|---|
| EP | 1 148 712 A2 | 10/2001 |
| EP | 1083742 A | 10/2001 |
| JP | 2000-023007 A | 1/2000 |
| JP | 2001-145010 | 5/2001 |
| JP | 2001-197371 | 7/2001 |

* cited by examiner

*Primary Examiner*—James M. Hannett
(74) *Attorney, Agent, or Firm*—Oblon, Spivak, McClelland, Maier & Neustadt, P.C.

(57) ABSTRACT

A digital still camera includes an image pickup device for photographing a subject, and an image processor adapted to drive and control the image pickup device, to process photographic signals outputted from the image pickup device and to record the processed images in a recorder. The image processor includes digitally zooming unit for selected a part of a photographic image plane photographed by the image pickup device and digitally zooming said part of the image. The image pickup device possesses two or more driving modes having respectively different numbers of pixels to be read out from the image pickup device. The digital still camera enables at least either one of monitoring in which restricted pixels are read out from the image pickup device and moving image recording, wherein a driving mode of the image pickup device is so selected as to maintain a resolution obtainable at the number of pixels in monitoring or that in recording moving images.

10 Claims, 5 Drawing Sheets

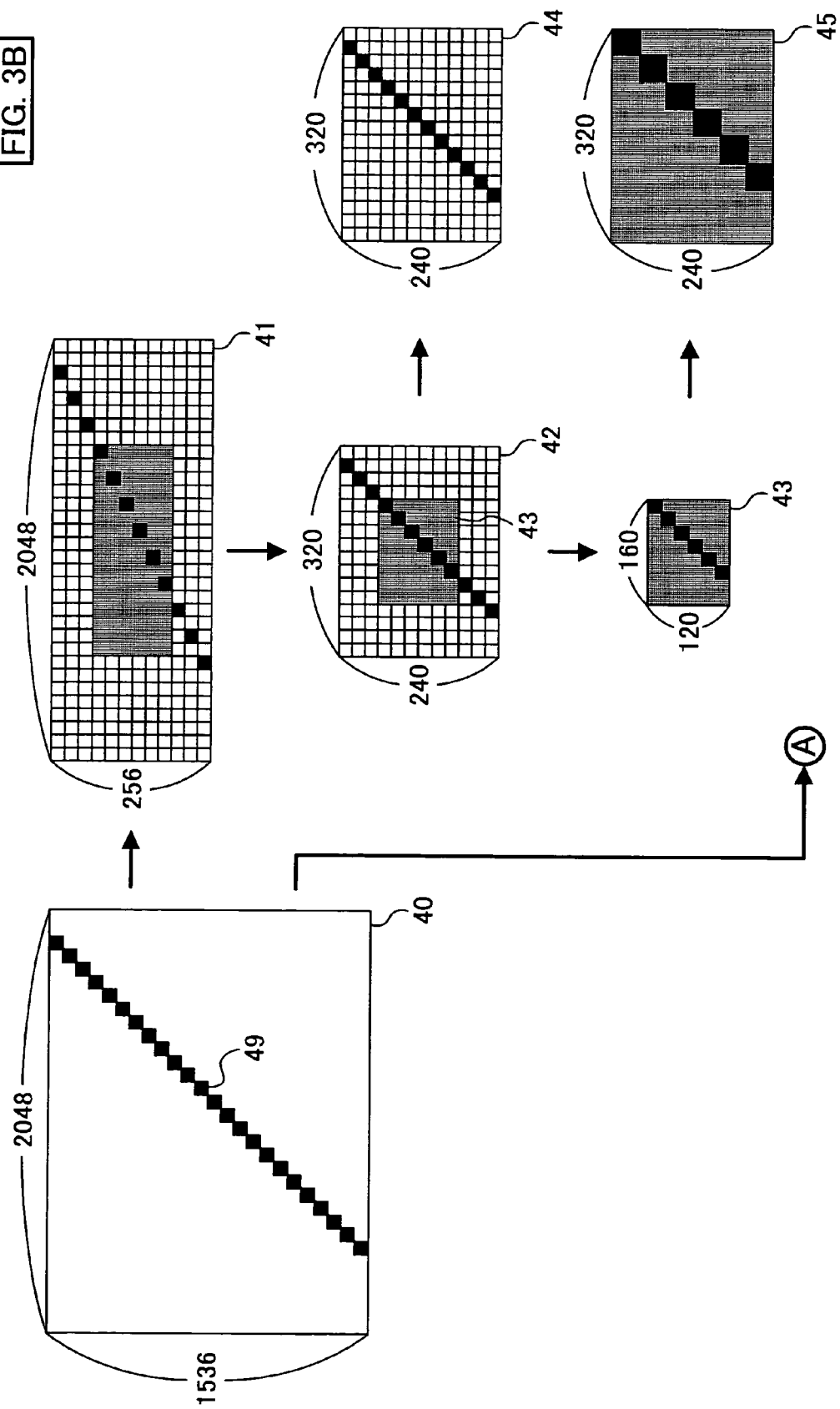

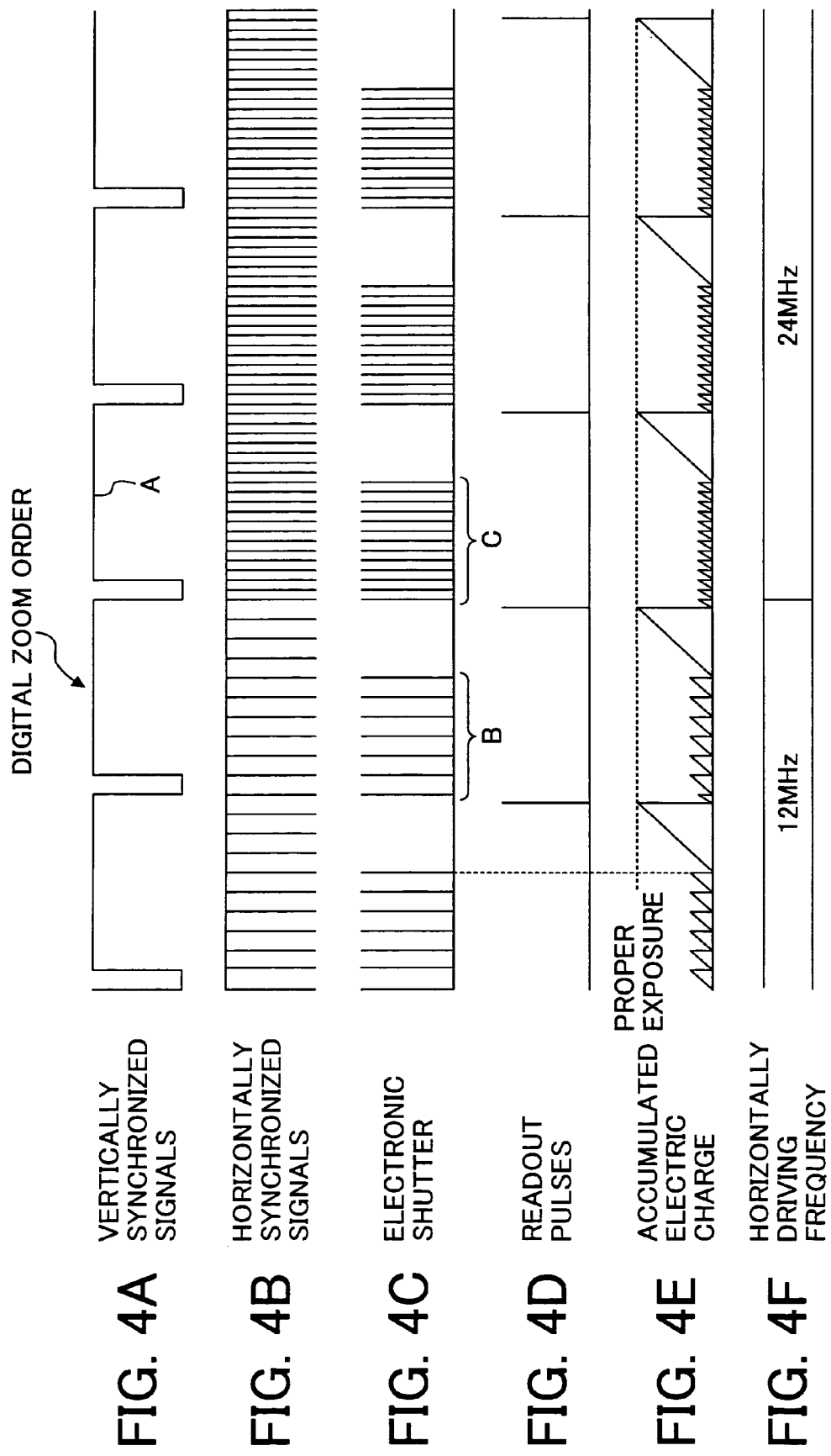

DIGITAL STILL CAMERA

FIELD OF THE INVENTION

The present invention relates to a digital still camera. More particularly, the invention relates to a digital still camera which possesses a digitally zooming function and in which at least either one of monitoring and moving image-recording is possible.

DESCRIPTION OF THE PRIOR ART

In the digital still cameras such as even ⅓ to ½ type class CCDs which have been used in popularized cameras following reduction in size of pixels, the numbers of pixels of image pickup devices (CCD) have been recently increasing up to 3 million to 5 million. These digital still cameras have monitoring modes in which restricted pixels are read out from the image picking up devices to preliminarily determine a photographing field angle so that the images may be displayed on displays such as LCD or TV at a relatively high speed (generally every 1/15 to 1/60 sec) with a certain cycle). Further, there have been released many digital cameras that possess a moving image-recording function by which monitored images are converted and recorded in a given recording format.

On the other hand, an interlace type structurally advantageous in miniaturization is a main stream in the CCDs used. However, even in the case of the interlace type CCDs, a type in which entire pixels are read out while each image is divided into 3 fields or 4 fields becomes a main stream instead of conventional 2 field-divided entire pixel readout type, because of decrease in volume of potential well of vertical transmitting paths. In case of a CCD of a primary color filter type which makes readouts in odd fields such as three fields, all three primary colors exist in one field, so that one image can be formed in one field only. In this case, if an images are read out with a CCD having 5 million pixels in three field system under effective vertical lines of about 2600, for example, the number of effective vertical lines per field is about 870 lines per field which correspond to the 2600 lines per field.

Further, ordinary CCDs each have modes of at least two driving systems. One of them is a draft mode in which vertically readout lines are restricted for the above monitoring, around 250 vertical lines near that of photographic signals in a one-side field for television are read out as the number of vertical lines, a renewing speed of an image plane is set at around 1/60 to 1/15 sec. so that the readout time of one image plane may not damage framing. The other is a frame readout mode for reading out the entire pixels. In the case of the above 5 million-pixel CCD, the time for reading out one field in the frame readout mode is 1/20 to 1/5 sec., since the number of the vertical lines is about triple as much as that in the 3 field-divided type if the draft mode and the horizontal drive frequency number are not varied.

There have been recently increasing CCDs which can produce images with different resolutions and different numbers of vertical lines by varying the driving mode of the CCD. Furthermore, it goes without saying that in case of random accessible image pickup devices such as a CMOS sensor, the pixels are partially and arbitrarily selected from the entire angle to change the resolution of an image outputted from the image pickup device. However, the CMOS sensor is seldom used as an image pickup device currently used in a digital still camera, because of problems such as fixed pattern noise.

Referring to the moving image recording, renewal rates (frame rates) of around 1/60 to 1/15 sec. are required to call it "moving images". If the renewal rate is lower than the above level, human eyes feels images uncomfortable. Since this renewal rate of 60 fps to 15 fps is equal to that in the above-explained monitoring, the above draft mode of the CCD is generally used in recording moving images of the digital still camera. Since the recording pixels include around 250 vertical lines as mentioned above, recording is generally made at a size of 320×240 (horizontal lines×vertical lines) corresponding to ¼ of those in VGA.

Next, digital zooming will be explained. The digital zooming means that only a central portion of each of images obtained from a CCD in performing monitoring or moving image recording, for example, are selected, and interpolated up to the number of pixels before selecting, so that a similar effect of enlarging a photographic subject may be obtained by digital processing as if it were optical zooming. Not mentioning a camera with no zooming function, since the digital zooming requires no optical lens to be driven, even a digital still camera having an optical zoom may be used in such a manner that only digital zooming is employed from standpoint of no sound generation and low electric power consumption during recording of moving images. There are also digital cameras in which greater magnification powers are obtained by using both digital zooming and optical zooming.

However, the image is enlarged up to a given number of the pixels by interpolation. In order to obtain a twice digitally zooming effect, for example, it is necessary in the case of the above-mentioned 320×240 recording that 160×120 in the central portion is selected and enlarged twice laterally and vertically. Thus, the actual vertical resolution corresponds to 120 lines, so that the resolution per image lowers as compared with 240 lines in a case where no digital zooming is employed.

As a prior art literature to solve the above problem, JP-A 2001-145010 discloses a digital camera which realizes a continuous photographic range at a maximum image quality for any magnification rate.

This digital camera is provided with a processor having an algorithm that compares the number of a set of pixels having a resolution in a prepared image file with that of a set of pixels which are selected in the file by a user and which corresponds to said set, and that offers, as a resolution of a final digitally zoomed image, a set of resolution pixel value of the prepared image file if the corresponding resolution pixel value is greater than that of the prepared image file, or a set of reduced resolution pixel values among the prepared image file if not.

However, there is a problem in the case of the conventional digital zooming system that as the magnification rate of the digital zooming increases, the resolution drops.

Further, JP-A 2001-145010 mentions the optimization of the resolution in using both the optical zooming and the digital zooming in the case of recording still images, but does not discuss moving image recording and monitoring unlike the present invention. In this publication, the number of input pixels itself is not varied, although driving of the image pickup device is changed.

SUMMARY OF THE INVENTION

It is an object of the present invention to provide a digital still camera which can produce a digitally zoomed effect without preventing deterioration in resolution as much as possible in the case of recording moving images, etc.

The digital still camera according to the present invention comprises an image pickup device for photographing a subject, and an image processor adapted to drive and control the image pickup device, to process photographic signals outputted from the image pickup device and to record the processed images in a recorder, said image processor comprising digitally zooming unit for selecting a part of a photographic image plane photographed by the image pickup device and digitally zooming said part of the image, said image pickup device possessing two or more driving modes having respectively different numbers of pixels to be read out from the image pickup device, said digital still camera enabling at least either one of monitoring in which restricted pixels are read out from the image pickup device and moving image recording, wherein a driving mode of the image pickup device is so selected as to maintain a resolution obtainable at the number of pixels in monitoring or that in recording moving images.

BRIEF DESCRIPTION OF THE INVENTION

For a better understanding of the invention, reference is made to the attached drawings, wherein:

FIGS. 4A to FIG. 4F are timing charts illustrating that the number of shuttering times of electronic shutter are varied in conformity with output frequencies from a clock generator.

Figure 1:
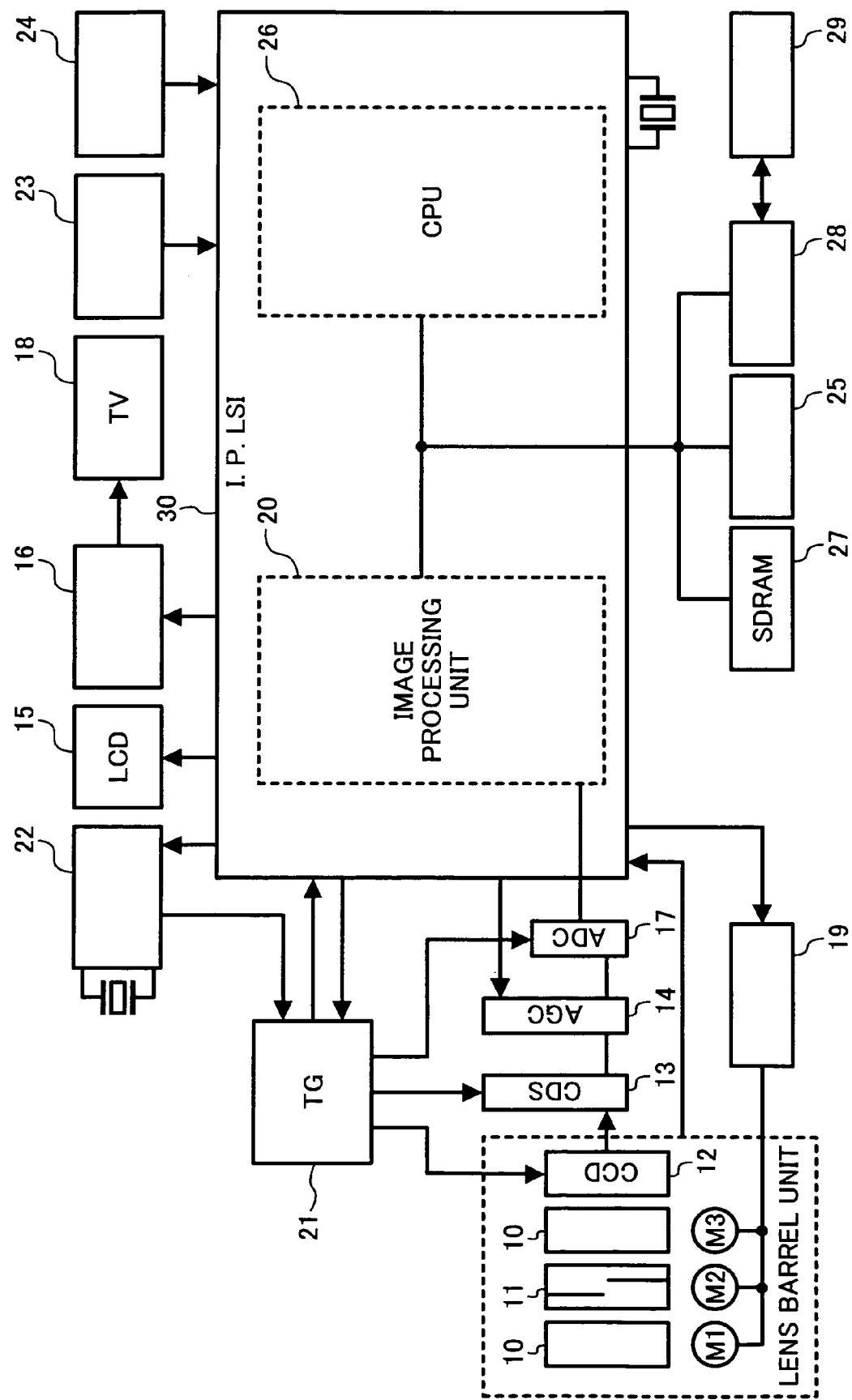
FIG. 1 is a block diagram showing the construction of a digital still camera according to an embodiment of the present invention.

In the following, the present invention will be explained in more detail using an embodiment shown in the drawings. The present invention is not limited to constituent elements, kinds, combinations, shapes, relative arrangements, etc. described in this embodiment, if no specific statement is made. This embodiment is merely illustrative, and the scope of the present invention is not limited to them.

FIG. 1 is a block diagram showing a digital still camera according to an embodiment of the present invention. This still camera comprises a photographic lens 10 for focusing optical information from a photographic subject on a CCD, an aperture/shutter 11 for condensing a bundle of light from the photographing lens 10, a CCD 12 (photographic pickup device) for photographing the subject through optoelectric conversion of the condensed optical information, a CDS circuit 13 for making double sampling to remove reset noise from picture signals (photographic signals) obtained by the optoelectric conversion, an AGC circuit 14 for amplifying the picture signals by a gain as a standard, an A/D conversion circuit 17 for converting the photographic signals from the AGC circuit 14 to a digital codes, said standard being adapted to correcting a dynamic range of the CCD 12 and the A/D conversion circuit 17, a motor drive 19 for driving a zoom motor M1, a shutter motor M2 and a focus motor M3, an image processor 20 for image processing output signals from the A/D conversion circuit 17, a CPU 26 for governing entire control of the digital still camera, a program ROM 25 for memorizing a control program and a correction table of the CPU 26, a clock generator 22 for generating a clock of an original oscillation, a timing generator (clock pulse generator) 21 for generating pulses at a given frequency by dividing a frequency of the clock generator 22, an LCD 15 for displaying monitored images, a video amplifier 16 for outputting the photographed images to an outside TV 18, a digital zooming setter 23 for setting digital zooming, an optical zooming setter 24 for setting optical zooming, a SDRAM (memory) 27 for memorizing compressed images, a card controller 28 for driving and controlling an outside memory card, a memory medium (memory) 29 such as a memory card, etc.

The image processor 30 comprises the image processing unit 20 and the CPU 26. This image processor 30 further comprises the digitally zooming unit for performing digital zooming.

A 3 million-pixel type CCD was used as the CCD 12. This CCD 12 is an interlace type in which entire pixels (frames) are read out while divided into three fields. A filter is a type of a primary color filter. As shown in FIG. 2A, the all colors are obtained even by one field in the frame readout mode.

Figure 2B:
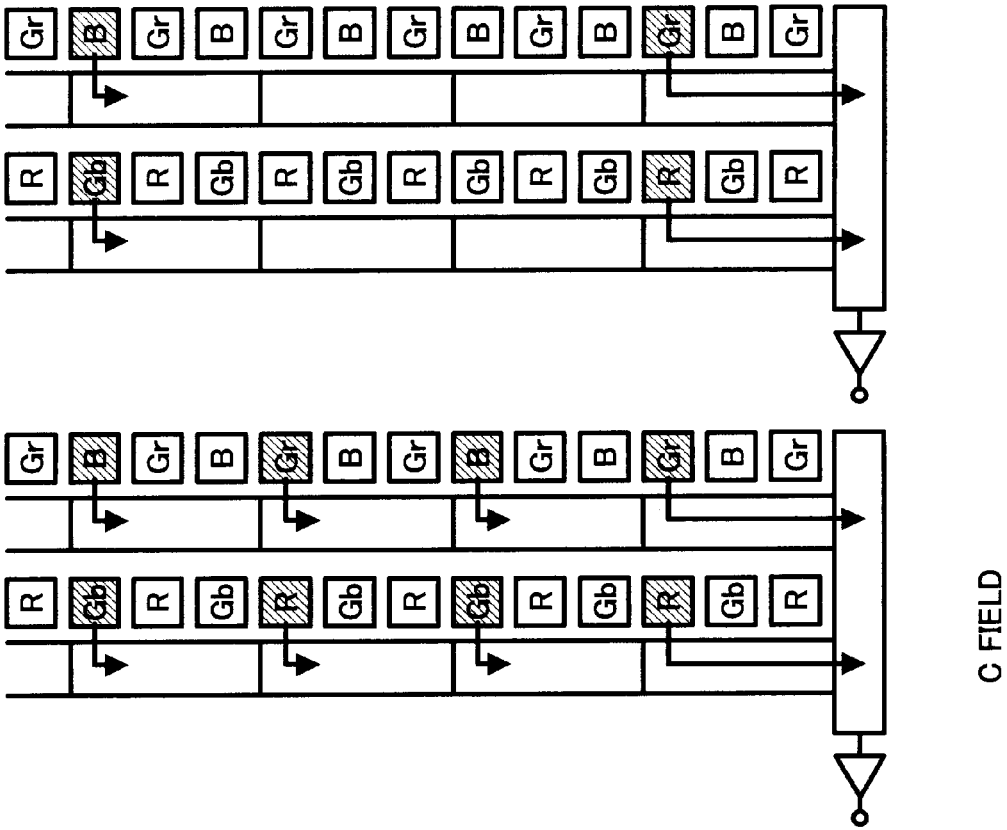
FIG. 2A and FIG. 2B are schematic views for illustrating a readout mode in each field.
Figure 2A:
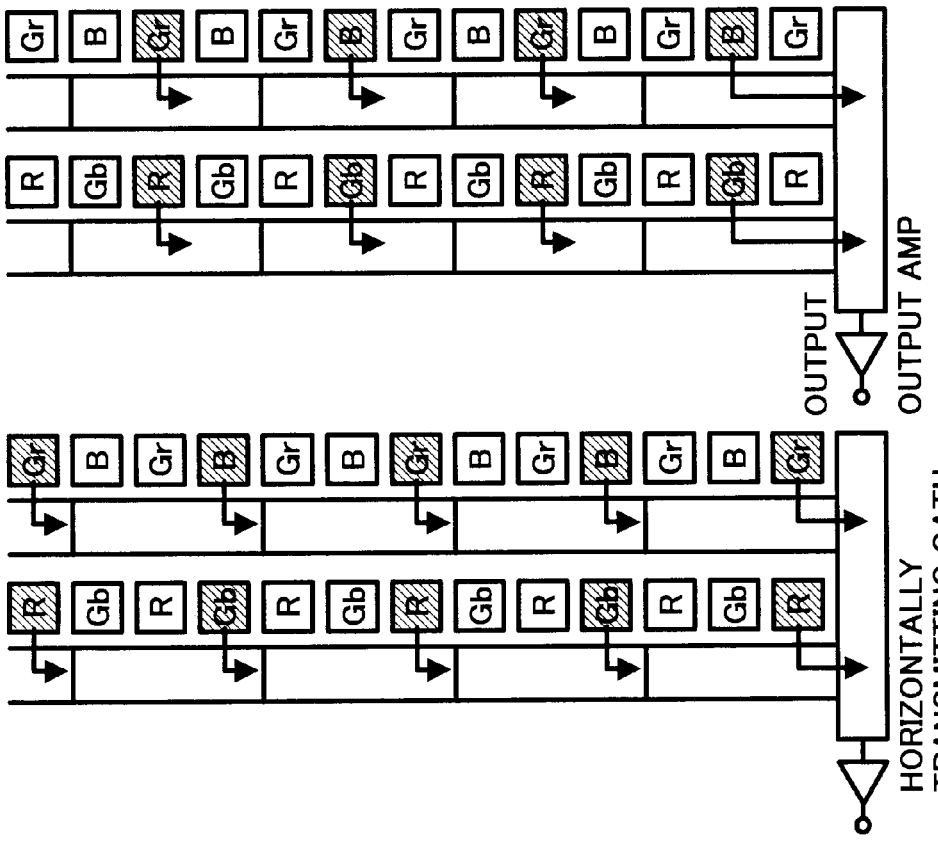

A draft mode shown in FIG. 2B is a driving mode in which two pixels are read out among vertically 12 pixels. Since 2048×1536 pixels are generally taken as the number of recording pixels in the case of 3 million pixels, the number of vertical pixels are set at 1536/(12/2) in the case of the draft mode with effective lines of 256, while the number of vertical lines per field in the case of the frame readout mode is set at 1536/3=512 effective lines. In order to maintain an aspect ratio, pixel skipping is effected in a horizontal direction in the downstream image processing LSI 30.

A time for reading out one image plane from the CCD 12 in each mode is made equal to a rate of the number of the effective vertical lines unless the number of the horizontal transmitting frequency is changed. When the CCD 12 is driven at the fastest horizontal driving frequency (its frequency is 24 MHz) which ensures its operation, the frame rate is 30 fps in the draft mode. In this digital camera, however, the driving is effected at 12 MHz in the draft mode so as to reduce the electric power consumption, and the frame rate is 15 fps. The ordinary monitoring is effected with the frame rate of 15 fps.

Next, an outlined function of this embodiment will be explained. Electric charge optoelectrically converted by the CCD 12 is subjected to double sampling in the CDS 13 (Correlated Double Sampling) to remove the reset noise, and then sent to the AGC (Auto Gain Control) circuit 17. The timing generator (TG). The timing generator (TG) 21 generates pulses (clock pulses) to drive the CCD 12. The timing generator 21 is controlled by the CPU 26 so that the generator 21 may generate the pulses to switch the driving mode or to operate the electronic shutter and control the amount of the exposure light.

In this embodiment of the digital camera, the exposure can be controlled by a fixed aperture type-electronic shutter only which is operated by the pulses outputted from the timing generator 21. The CPU 26 controls the timing generator 21 based on an estimated exposure value outputted from the image processing unit 20. By this controlling, the electronic shutter is operated to appropriately control the exposure.

The AGC circuit 14 is afforded with a gain called "standard gain" so as to conform the dynamic range of the CCD 12 with that of the ADC (Analog to Digital Conversion) 17. The photographic signal adjusted to an appropriate signal level is converted from an analogue signal to a digital signal in the ADC circuit 14, which is then sent to the image processor LSI 30. Within the image processor LSI 30, pedestal processing, color separation, interpolation, white balancing, γ processing, RGB•YUV processing, etc. are performed. In the case of monitoring, images are continuously outputted to the LCD 15.

In recording still images, the aperture/shutter 11 is closed after exposure of the recording frame, the driving of the CCD 12 is set to the frame readout mode. After the entire pixels are read out, the same processing as in monitoring is effected to perform JPEG compression, which is recorded in the recording medium 29.

In the case of recording the moving images, the CCD 12 is driven in the same draft mode as in monitoring. The photographed image data are resized in a desired image size. The resized image data are continuously compressed, while being related to preceding and succeeding images, and successively written in the recording medium 29. Alternatively, it may be that the photographed image data are memorized in the SDRAM 27 in the above-resized state, and then written in the recording medium 29 simultaneously with the termination of photographing, while being compressed. The photographed image data may be written in any of various other methods.

The recording format is generally a motion JPEG or MPEG4. The photographed image data are frequently resized at the number of pixels: 320×240 (horizontal×vertical) or 160×120.

This is because the renewal rate needs to be equivalent to that in the monitoring. There is a background that the above size is selected as a normalized size in which the number of the vertical lines obtained in the draft modes is within 256. If moving image are to be recorded at a greater number of pixels, use of a CCD of a progressive type in which the entire pixels can be read out without using the aperture/shutter 11 may be considered. However, as compared with the interlace type CCD, there are problems in that the progressive type CCD has a more complicated structure and is difficult to be miniaturize, inevitably resulting in increased cost. Therefore, the digital still cameras using CCDs of the progressive type have been seldom commercialized at present.

However, there is no problem in using the CCD of the progressive type for obtaining the effects of the present invention. In order to increase the number of the vertical lines to be read out from the CCD 12 while maintaining the renewal rate, it is necessary to increase the horizontally driving frequency. Since the electric power consumption in the photographing system almost proportionally increases with increase in the horizontally driving frequency, this is a not so good method in the digital still camera as a handy device of which consumed electric power is to be suppressed.

Figure 3B:
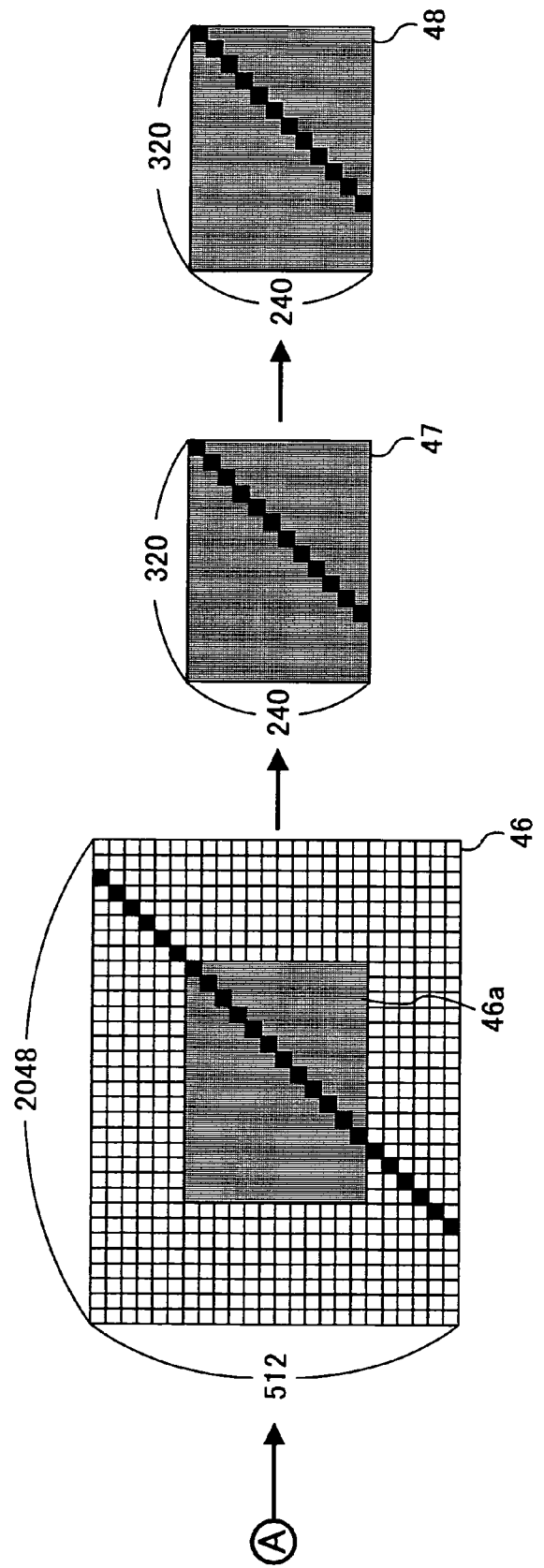
FIG. 3 is a schematic view for illustrating digital zooming according to the present invention.

FIG. 3 is a diagram for illustrating the digital zooming according to the present invention. For facilitating the comparison, the conventional processing way is also shown. A reference numeral 40 shows an image of a subject on one plane of the image pickup device. Explanation is made on the assumption that this image of the subject is formed by 2048× 1536 pixels. As shown in an upper portion of FIG. 3, the digital zooming method in the conventional monitoring and moving image recording is that pixels 41 of 2048×256 obtained in the draft mode is reduced to pixels 42 of around 320×240 by thinning horizontal pixels so as to be in conformity with the aspect ratio in the LCD or TV as an outputting means. If no digital zooming is employed, the image 44 in this state is transmitted to the outputting means after being subjected to a given processing.

In order to realize a twice digital zooming, it is a conventional way that pixels 43 of 160×120 are selected from the above 320×240 pixels 42 while their centers being aligned, and then enlarged up to pixels 45 of 320×240 by interpolation. Therefore, although an enlarged image of the central portion 43 is obtained, but its resolution is deteriorated.

In order to increase the number of pixels of the CCD 12 to be outputted, if the digital zooming is ordered, the horizontal driving frequency is switched from the next VD timing, and the driving mode of the CCD 12 is changed from the draft mode to the frame readout mode. This is shown in a lower portion of FIG. 3.

First, the draft mode is changed to the frame readout mode with the pixels 46 of 2048×512. One section of the pixels consists of 64 horizontal pixels and about 21 vertical pixels, while a shadowed portion 46a amounts to ½ of each of the horizontal and vertical ranges with respect to the entire field angle. The pixels 47 of 320×240 selected from the shadowed portion 46a is an image having horizontal and vertical lines met with the aspect ratio of an output stage. One square of the pixels consists of 20 pixels in each of the horizontal and vertical directions. The pixels 47 in the shadowed portion corresponds to ½ of the entire field angle in each of the horizontal and vertical directions. This image is taken as an image 48 at a digital zoom of twice as an image in monitoring or moving image recording.

Even if the digital zooming is ordered, the above operation maintains relationship at up to 512/240=2.13 times in which the number of the vertical lines obtained by the CCD is greater than that of the vertical lines shown in monitoring or in moving image recording. If the magnifying rate greater than that is ordered, the vertical resolution at 512/256=2 times is constantly obtained by continuing the frame readout mode with respect to the conventional technique. However, if the horizontally driving frequency for the CCD is still 12 MHz, the vertical lines are twice, so that the frame rate is as half as 7.5 fps as that at the draft mode driving because the vertical lines are twice. If the frame rate is delayed in monitoring or moving image recording, it is easily envisaged that this causes unpleasant feeling. Thus, the frequency of the above clock generator 22 is changed from 12 MHz to 24 MHz. By so doing, while the frame rate at the draft mode in which no digital zoom is used is being maintained at a given value, a digitally zoomed image having a high resolution can be obtained.

However, this is not preferable, because the input number of HD in one VD (in other words, the number of the vertical lines per image) changes and consequently the level of the output signals varies. Signals are ordinarily outputted to the electronic shutter in synchronization with the HD. Therefore, if the number of shuttering times of the electronic shutter is kept at the same level, the exposing time becomes longer and the exposure is excessive when the output frequency of the clock generator 22 increased. To the contrary, if the frequency is changed to a lower level, the exposure lacks. Therefore, it is necessary to adjust the number of shuttering times of the electronic shutter to be in conformity with the frequency of the output from the clock generator 22.

FIG. 4A to FIG. 4F show a timing chart showing the above situation. FIG. 4A shows vertically synchronized signals VD, FIG. 4B horizontally synchronized signals HD, FIG. 4C signals for the electronic shutter, FIG. 4D readout pulses, FIG. 4E accumulated electric charge amounts, and FIG. 4F horizontally driving frequencies. For example, if digital zooming is ordered at a point A of the vertically synchronized signal VD, the number of shuttering times of the electronic shutter is B when the horizontally driving frequency is 12 MHz. When the horizontally driving frequency is changed twice to 24 MHz, the number of shuttering times of the electronic shutter is changed twice to C. That is, the number of shuttering times of the electronic shutter is adjusted in conformity with the frequency of the output from the clock generator 22. By so doing, image signals (photographic signals) outputted from the CCD 12 can be adjusted to a constant level without excess or lack of the exposure.

As a matter of course, a gain adjustment is possible in the downstream AGC circuit 14 or image-processing circuit 20. However, the photographed images are deteriorated in that case in that the CCD 12 is more earlier saturated (the downward gain decreases because of overcharging of the CCD) or S/N ratio is damaged (the downward gain increases because of underlying of the CCD 12) due to breakage of the setting of the dynamic range.

What is claimed is:

1. A digital still camera comprising:
an image pickup device for photographing a subject; and
an image processor adapted to drive and control the image pickup device, to process photographic signals outputted from the image pickup device and to record the processed images in a recorder,
said image processor comprising a digitally zooming unit for selecting a part of a photographic image plane photographed by the image pickup device and digitally zooming said part of the image,
said image pickup device possessing two or more driving modes having respectively different numbers of pixels to be read out from the image pickup device, and
said digital still camera enabling at least either one of monitoring in which restricted pixels are read out from the image pickup device and moving image recording, wherein
the driving mode of the image pickup device is so selected as to maintain a resolution obtainable at the number of pixels in the monitoring or that in the moving image recording,
said driving mode comprises a draft mode in which a renewal rate of image planes is so set as to not hinder framing and a frame readout mode in which all pixels are read out,
said image pickup device is driven in said draft mode in said monitoring mode and moving image recording,
the driving mode of the image pickup device is changed from the draft mode to the frame readout mode when the digital zooming is effected by said digitally zooming unit in said monitoring mode or moving image recording, and
given pixels are selected as a digitally zoomed image plane from one field read out in the frame readout mode.

2. The digital still camera set forth in claim 1, wherein said given pixels are selected taking a center thereof in conformity with that of the one field.

3. The digital still camera set forth in claim 2, which comprises a clock pulse generator for generating clock pulses to drive said image pickup device and wherein when the driving mode of the image pickup device is changed, a frequency of the clock pulses is changed in such a manner that a renewal rate of the image planes may be kept at a given value.

4. The digital still camera set forth in claim 3, wherein the frequency of said clock pulses is changed only when the moving image recording is performed.

5. The digital still camera set forth in claim 4, wherein a level of photographic signals outputted from said image pickup device is made constant by changing the number of shuttering times of an electronic shutter in conformity with the frequency of the clock pulses.

6. The digital still camera set forth in claim 5, wherein said clock pulses are horizontally synchronizing signals.

7. The digital still camera set forth in claim 1, which comprises a clock pulse generator for generating clock pulses to drive said image pickup device and wherein when the driving mode of the image pickup device is changed, a frequency of the clock pulses is changed in such a manner that a renewal rate of the image planes may be kept at a given value.

8. The digital still camera set forth in claim 7, wherein the frequency of said clock pulses is changed only when the moving image recording is performed.

9. The digital still camera set forth in claim 7, wherein a level of photographic signals outputted from said image pickup device is made constant by changing the number of shuttering times of an electronic shutter in conformity with the frequency of the clock pulses.

10. The digital still camera set forth in claim 9, wherein said clock pulses are horizontally synchronizing signals.

* * * * *